United States Patent
Holt et al.

[11] Patent Number: 5,899,221
[45] Date of Patent: May 4, 1999

[54] FLUID PRESSURE REGULATOR

[76] Inventors: Daniel A. Holt; Trevor K. Markham, both of 5235 Tacco, San Antonio, Tex. 78244

[21] Appl. No.: 08/793,769

[22] PCT Filed: Jun. 30, 1995

[86] PCT No.: PCT/US95/08258

§ 371 Date: Oct. 17, 1997

§ 102(e) Date: Oct. 17, 1997

[87] PCT Pub. No.: WO96/01445

PCT Pub. Date: Jan. 18, 1996

[51] Int. Cl.[6] .................................................. G05D 16/10
[52] U.S. Cl. .................. 137/116.5; 137/505.25; 137/505.28
[58] Field of Search .................. 137/505.25, 505.28, 137/116.5

[56] References Cited

U.S. PATENT DOCUMENTS

| | | | |
|---|---|---|---|
| 614,441 | 11/1898 | Burnett | 137/505.25 |
| 1,045,197 | 11/1912 | Schuler | 137/505.25 |
| 4,181,139 | 1/1980 | Martini | 137/505.25 X |
| 5,411,053 | 5/1995 | Markham et al. | 137/505.28 |

*Primary Examiner*—Stephen M. Hepperle
*Attorney, Agent, or Firm*—Miller, Sisson, Chapman & Nash, P.C.

[57] ABSTRACT

A fluid pressure regulator capable of adjustably setting a cut-off pressure between an upper and a lower limit having a two-piece valve body where the two pieces are threadably joined such that adjusting the distance between the two pieces (34, 54) of the valve body moves a piston (12) stem valve operating a high pressure port (40) towards or away from the high pressure port while not changing the distance between a spring (84) engaging the piston (12) and the piston head (14).

13 Claims, 5 Drawing Sheets

FLUID PRESSURE REGULATOR

FIELD OF THE INVENTION

Fluid pressure regulators, more specifically a fluid pressure regulator capable of adjustably selecting a cut-off pressure between an upper and a lower limit.

BACKGROUND

Fluid pressure regulators regulate the flow of fluid between a high pressure port and a low pressure port. Typically, regulators are preset to allow fluid to flow when pressure at a low pressure port drops below a predetermined upper limit.

One type of pre-set regulator is known as a piston-type regulator. This regulator typically comprises a valve body, a hollow stem piston and a spring. When fluid pressure at the low pressure port of the valve body drops below a pre-set minimum, a coil spring operating on the underside of the piston head lifts the piston operated stem valve off the high pressure inlet port to provide fluid flow between the inlet port and the outlet port. At the same time, some of the fluids flow up the hollow piston stem to be captured in the cylinder head between the head of the valve body and piston face. As pressure at the outlet port increases, so does back pressure in the cylinder forcing the piston down and the piston stem valve against the high pressure inlet port.

U.S. Pat. No. 4,924,904 discloses a piston-type pressure regulator having a variable pressure differential adjustability through the use of a camming plate that can adjustably preload the spring which acts on the piston body, tending to force the stem of the piston off the high-pressure valve seat. This is effected by adjusting the preload on the spring against the piston and selectively compressing the spring to achieve the desired pressure differential (cut-off pressure) of the piston stem against the valve seat.

Applicant's invention provides, however, in a unique piston type fluid regulator, the capability of providing in a single regulator a device capable of adjustably selecting a cut-off pressure.

SUMMARY OF THE INVENTION

Applicant's invention provides a two-piece valve body which allows the distance between the face of the piston operated stem valve of the piston and the high pressure inlet port with which it engages, to be adjustably set. By doing so, the result will be changing the cut-off pressure at the low end port. That is, if the distance between the face of the stem valve and the high pressure inlet port is increased by threadably adjusting the two pieces of the valve body, then greater pressure (the spring would require more linear compression) will be required to shut off the high pressure port. By decreasing the distance between the face of the stem valve and the low end port, less pressure will be required to seat the stem valve against the high pressure port and cut off the high pressure source.

Applicant's embodiments also include one having a movable inlet port orifice. The purpose of the movable inlet port orifice is to help maintain the cut-off pressure at its preset value as the source pressure drops and fluid in the source bottle is used up. This helps avoid the necessity of making small adjustments to the valve body to maintain a preset cut-off pressure.

It is, therefore, the object of Applicant's present invention to provide, in a piston type fluid pressure regulator, a means of randomly selecting a cut-off pressure between an upper and lower limit by utilizing a two-piece valve body capable of adjustably setting the distance between a high pressure port and piston operated stem valve while maintaining a fixed distance between the spring seat and the piston.

DETAILED DESCRIPTION OF THE PREFERRED EMBODIMENT

Figure 1:
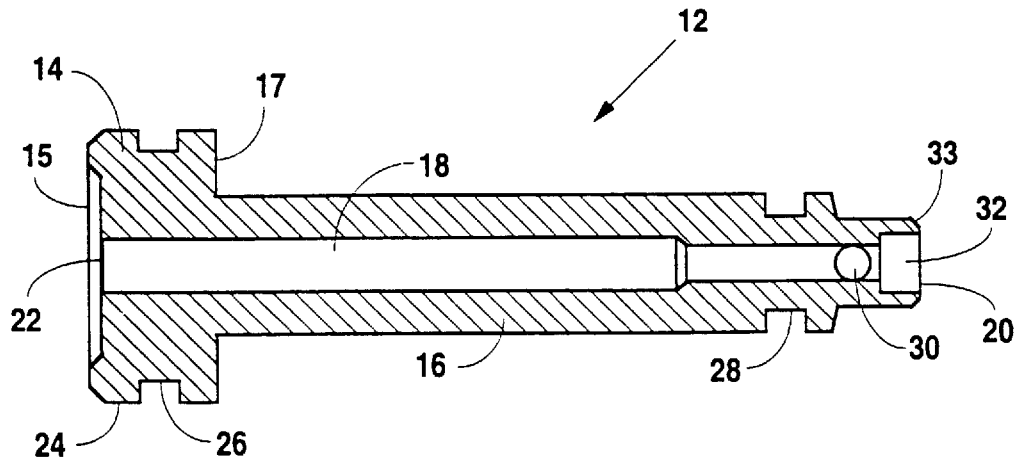
FIG. 1 is a side elevational cut-away view of the piston of Applicant's present invention.

Perhaps it is most effective to illustrate and discuss the separate pieces of Applicant's present invention at the outset and finish with the way the pieces fit together into a unitary, functional regulator followed by a brief description of the manner in which the regulator operates. With that in mind, we turn now to FIG. 1 which illustrates the preferred embodiment of piston (12) of Applicant's present invention. In general, the piston is seen to be not much different than pistons found in prior art piston regulators. Piston (12) is seen to have cylindrical piston head (14) with a face or top surface (15) at one end of piston head (14). Piston stem (16) is, like head (14) cylindrical and is coincident with the longitudinal axis of piston (12). It is hollow, having an external diameter less than that of piston head (14). Stem (16) joins underside or bottom of bottom surface (17) of piston head (14) as illustrated in FIG. 1. As stated, stem (16) is hollow having a longitudinal channel (18) along the longitudinal axis thereof extending from a first end (20) at a stem face and a second end (22) open to piston face (15). Piston head (14) has side walls (24) which are notched or grooved to define a sealing ring groove (26). Likewise, near first end (20) of channel (18) are walls defining yet another sealing ring groove (28), the walls of the groove being integral with the walls defining the outer surface of stem (16). More details of first end (20) reveal that channel (18) communicates through stem at ports (30). Further, first end (20) of stem (16) is seen to have walls defining an indent portion (32) designed to accommodate a seat, adjacent a stem lip (33). Last, both sealing ring grooves (26) and (28) are dimensioned to accept sealing rings for fluid sealing relationship with walls as more particularly set forth with reference to FIGS. 2 and 3 more particularly below.

Figure 2:
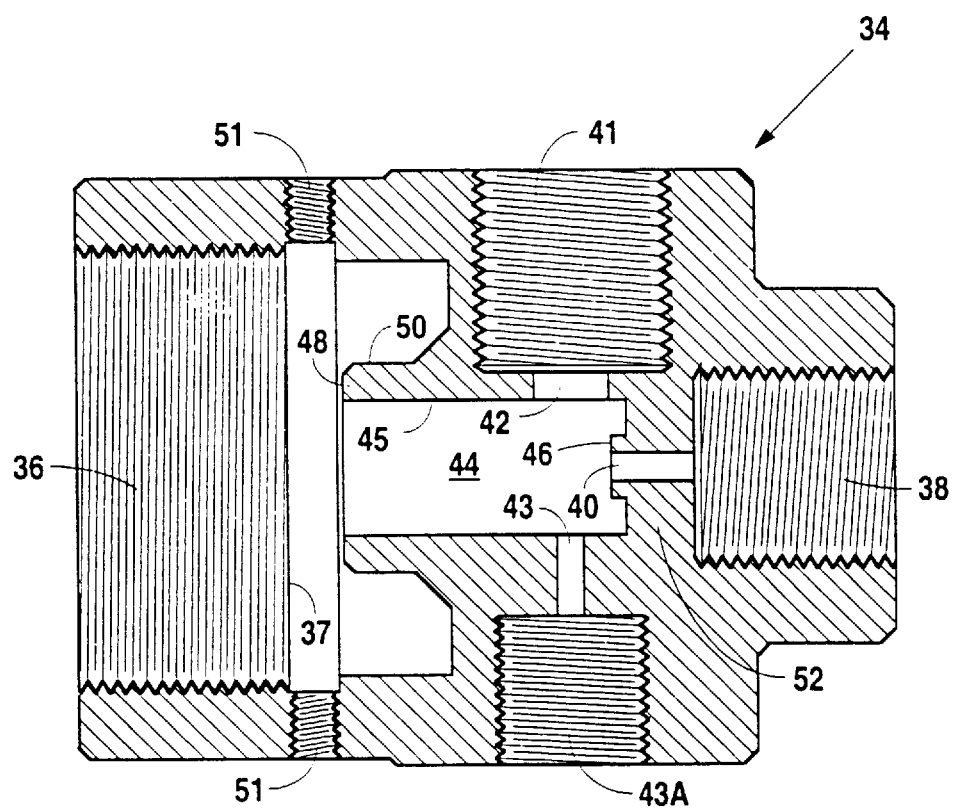
FIG. 2 is a side elevational cut-away view through the center of the first valve body of Applicant's present invention.

FIG. 2 illustrates a first valve body (34) having a generally irregular exterior shape. First valve body (34) is comprised of a first threaded portion (36) terminating at shoulder (37) defining, in part, some of the inner walls of the valve body. Adjacent to shoulder (37) are threaded passageways (51) designed for the receipt of set screws therein. It can be seen that the inner walls of first valve body (34) also have a second threaded portion (38) terminating at a high pressure port (40) and a third threaded portion (41) terminating at low pressure port (42). Auxiliary port (43) provides communication between intermediate chamber (44) and fourth threaded portion (43a). The first threaded portion (36) will receive the second valve body as set forth in more detail with respect to FIG. 3 below. The second threaded portion (38) is designed to accept the high pressure fluid vessel connective device. The third threaded portion (41) engages the low pressure source and the fourth threaded portion (43a) engages a pressure gauge to measure pressure in intermediate chamber (44).

A portion of the inner walls of first valve body (34) are dimensioned to provide a cylindrical intermediate chamber (44) which communicates with the area outside valve body (34) through both ports (40) and (42). Intermediate chamber (44) is defined by cylindrical inner walls (45). Adjoining cylindrical walls (45) and part of the walls defining intermediate chamber (44) are a lip (46) which encircles one end of high pressure port (40) and base (52) from which lip (46) projects. It is further seen in FIG. 2 how cylindrical inner walls (45) make up, in part, a portion of stem receiving member (48) which is also defined, in part, by stem receiving member walls (50). The function of the structure of first valve body (34) and the details related with the discussion of FIG. 2 set forth herein above will become more apparent with reference to FIG. 5 below.

Figure 3:
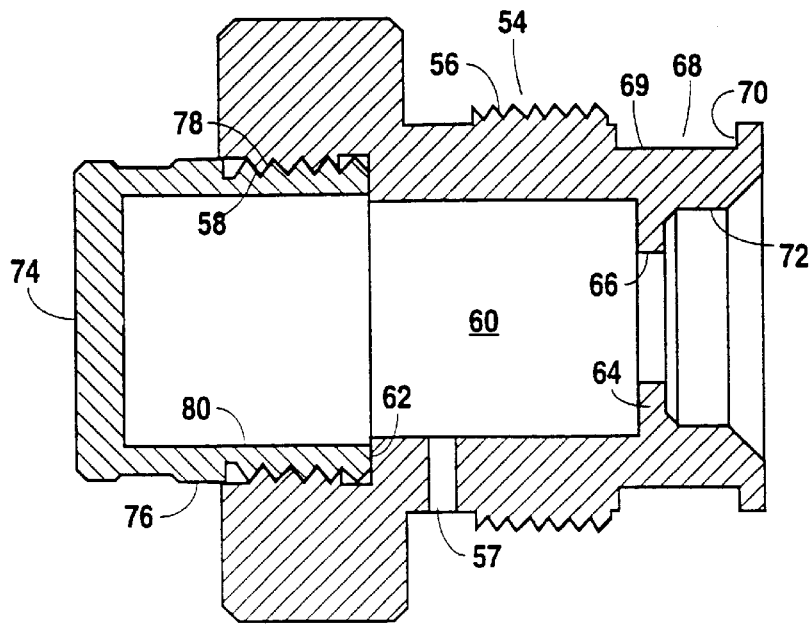
FIG. 3 is a side elevational cut-away view through the center of the second valve body, including cylinder head, of Applicant's present invention.

FIG. 3 illustrates a second valve body (54) having an outer surface defined in part by a first threaded portion (56) and having an inner surface defined in part by a second threaded portion (58). The inner surface also has walls defining spring chamber (60) dimensioned for receipt of a spring therein. A shoulder (62) separates second threaded portion (58) from spring chamber (60). A partition (64) at the base of spring chamber (60) provides a support base for a coil spring or other bias means and terminates at stem bore (66) dimensioned for receipt of stem (16) therethrough. Annular gap (68) is provided in the outer walls of second valve body (54) for engagement with set screws as more particularly described with reference to FIG. 4 below. Annular gap (68) is defined in part by wall (69) and at one end by shoulder (70). An inner wall portion (72) of second valve body (54) is designed for receipt of stem receiving member (48) therein, as noted by the similarity between their shapes. Relief port (57) is provided to maintain ambient pressure in spring chamber (66).

FIG. 3 also illustrates a cylinder head (74) having outer walls (76) which include a threaded portion (78) and having inner walls (80) which are cylindrically shaped and dimensioned to slidably accept the piston head (14) therein. Cylinder head (74) is screwed into second valve body (54) such that threaded portion (78) engages second threaded portion (58) of second valve body (54), and becoming an integral part of second valve body, hereinafter referred to as the second valve body.

Figure 4:
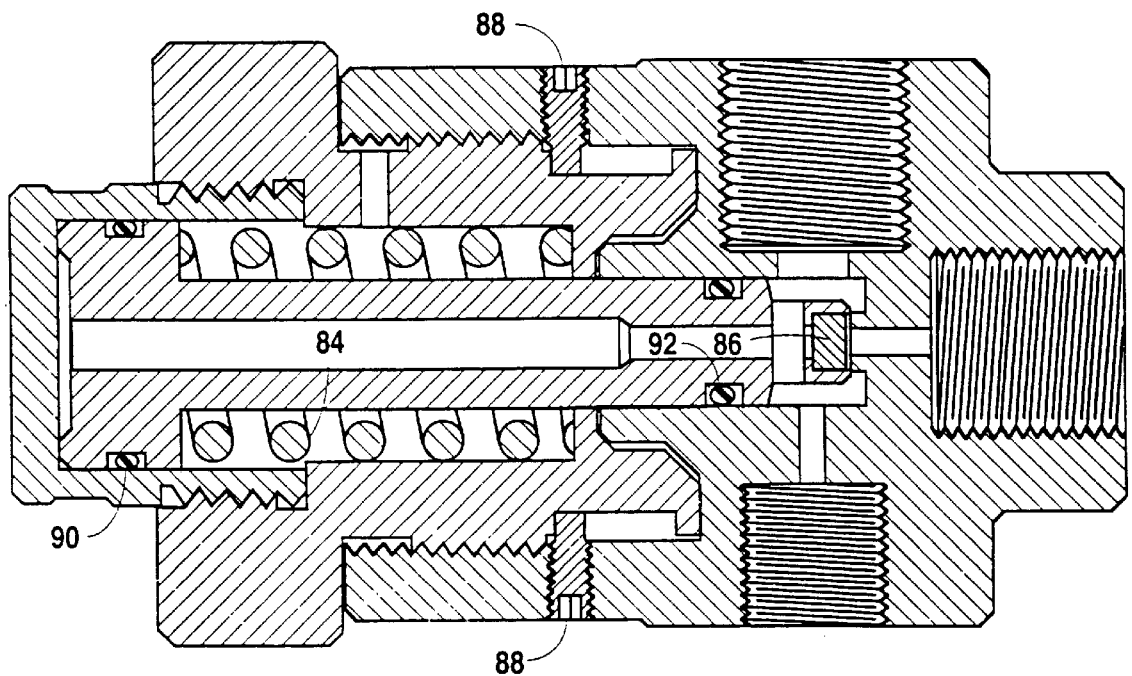
FIG. 4 is a cut-away elevational view of the entire regulator with first and second valve bodies, piston, spring, piston stem, and port sealing means.

With reference to FIG. 4, it is seen that piston (12) is inserted with coil or disk spring (84) over stem (16) with first valve body (34) threadably engaged to second valve body (54). More particularly, first threaded portion (36) of first valve body (34) engages first threaded portion (56) of second valve body (54). Stem face (20) is adjacent seat (86) to contact high pressure port (40) at lip (46). Seat (86) is typically cylindrically shaped and comprised of a durable, non-metallic material, such as Teflon. In operation, typically seat (86) will contact lip (46) of high pressure port (40). At this point, spring (84) has contacted at a first end, underside or bottom surface (17) of piston head (14) and at the other end is seated against partition (64).

FIG. 4 also illustrates the manner in which set screws (88) are typically and preferably in close proximity to the wall (69) of annular gap (68) and, in conjunction with shoulder (70), act as a means to lock the two valve bodies together to prevent unintended uncoupling. More specifically, FIG. 4 illustrates the use of set screws 88 which, when threaded through the walls of first valve body (34) such that they are preferably locked in close proximity to the wall (69) of annular gap (68), can prevent, by interference with shoulder (70), the two valve bodies from separating. As set forth above with reference to the preceding figures, sealing means are required at grooves (26) and (28). FIG. 4 illustrates the use of "O" rings (90) and (92) to effect a substantially fluid-tight seal. Thus, it is important for the set screws and shoulder to be situated such that they engage one another before the threads engaging the two valve bodies disengage.

In operation, the two valve bodies are threaded together until the valve stem comes into proximity of the high pressure port and then adjusted so that fluid at the high pressure port may flow into the intermediate chamber. The high pressure fluid source is connected to the second threaded portion and the low pressure vessel is threaded to the third threaded portion of the first valve body. The fourth threaded portion will typically provide a gauge for measuring pressure in the intermediate chamber. With the gauges and vessels attached to the first valve body in fluid sealing relation, the high pressure source is vented to the high pressure port which will fill the intermediate chamber and go up the channel in the piston stem to act on the piston face and drive the piston down to seat the high pressure valve when pressure in the intermediate chamber, generated at the low pressure port drives the piston head and stem valve against the high pressure port. A suitable gauge located in the fourth threaded portion will measure the pressure at which such cut-off occurs. The user may then adjustably increase or decrease that cut-off pressure, changing the distance between the two valve bodies by holding one valve body while rotating the other. Moving the stem valve away from the high pressure port will increase the cut-off pressure, moving it towards the high pressure port will decrease the cut-off pressure. By adjustably locating this distance while watching the intermediate chamber gauge (not shown), the user may adjustably set the cut-off pressure desired.

Figure 5:
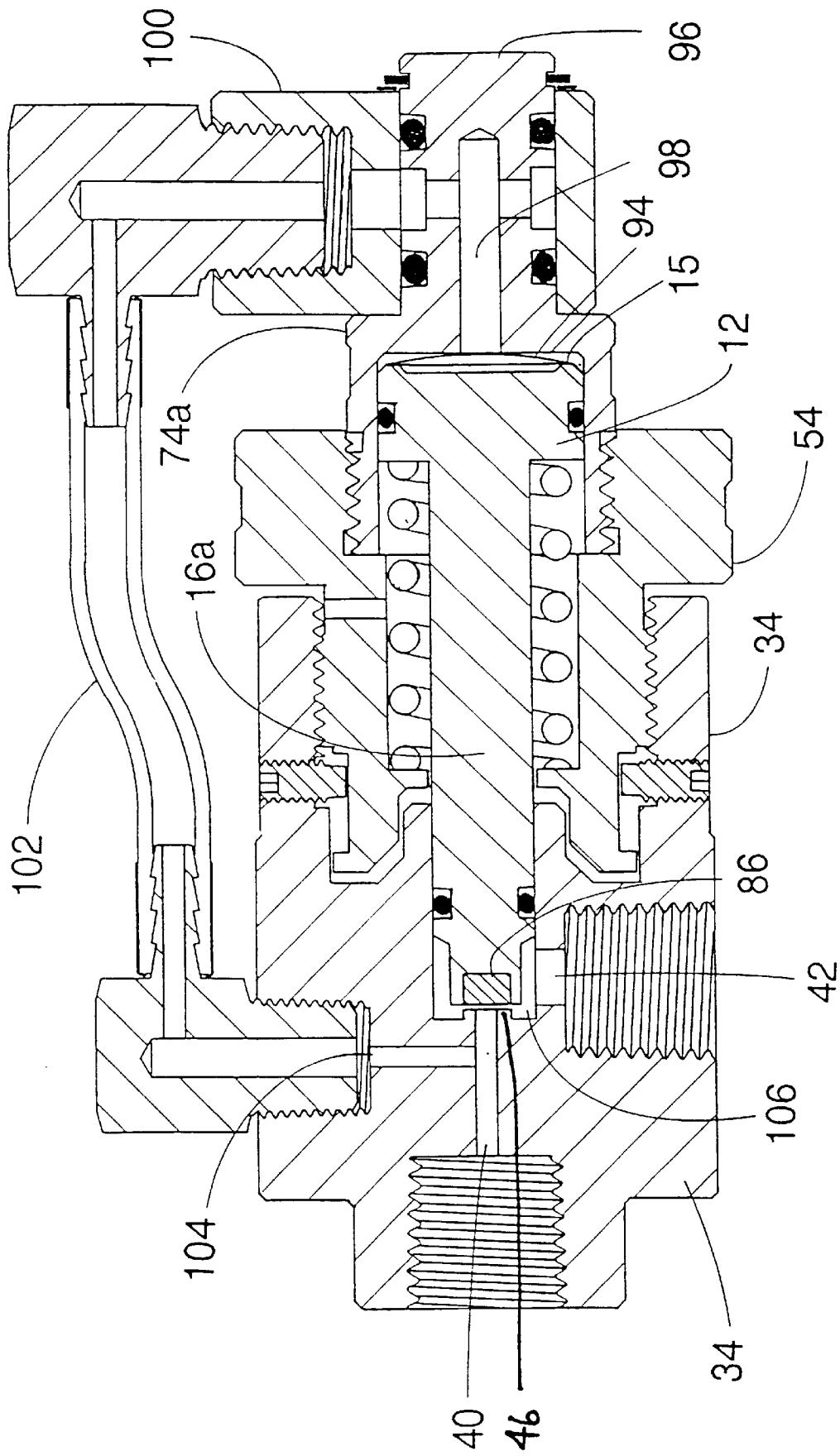
FIG. 5 illustrates a cross-sectional elevational view of an alternate preferred embodiment for Applicant's present invention which includes an external connection tube providing fluid communication between the high pressure inlet port and the space between the piston head and the cylinder head.

FIG. 5 illustrates another alternate preferred embodiment of Applicant's invention. More specifically, FIG. 5 illustrates first valve body (34) and second valve body (54) containing therein piston (12) having a solid stem (16A) instead of the hollow stem (16) as provided for in the embodiments illustrated above. Having a solid stem, fluideous communication must be provided by another means to the region between top surface (15) of piston (12) and cylinder head (74A). This is done by modifying the cylinder head of previous embodiments in the manner set forth in FIG. 5 with reference to element (74A). Here, port (104) of first valve body (34) is connected to cylinder head (74A) through use of connection means (102), such as a tube. Connection means (102) is connected to cylinder head (74A) through modifications including cylinder head port (98). Engagement means (100) engageable with stem portion (96) of cylinder head (74A) provides ready connection between connection means (102), here simply a fluid-tight external connection tube made of brass, copper, or other suitable material. Fluid enters high pressure port (42) which is open to first chamber (106). As pressure at port (104) drops below cutoff, seat (86) will lift off lip (46), allowing fluid from first chamber (106) to flow through ports (104) and (40) until back pressure at port (40) is sufficient to urge piston (12) with seat (86) against lip (46).

FIG. 5 is also used to illustrate the use of bias means (94) for preloading piston (12) for urging towards low pressure port (40). Bias means (94) here is a spring steel cylindrical washer. Applicant has found that providing a preloading condition such as bias means (94) produces increased sensitivity of cutoff pressure adjustment by overcoming required sealing pressure at the high pressure inlet port, especially when providing a cut-off pressure in the ranges from 0 up to about 60 pounds per square inch. Use of bias means (94), of course, can be provided with all embodiments illustrated earlier, not just the embodiment illustrated in FIG. 5.

Figure 6:
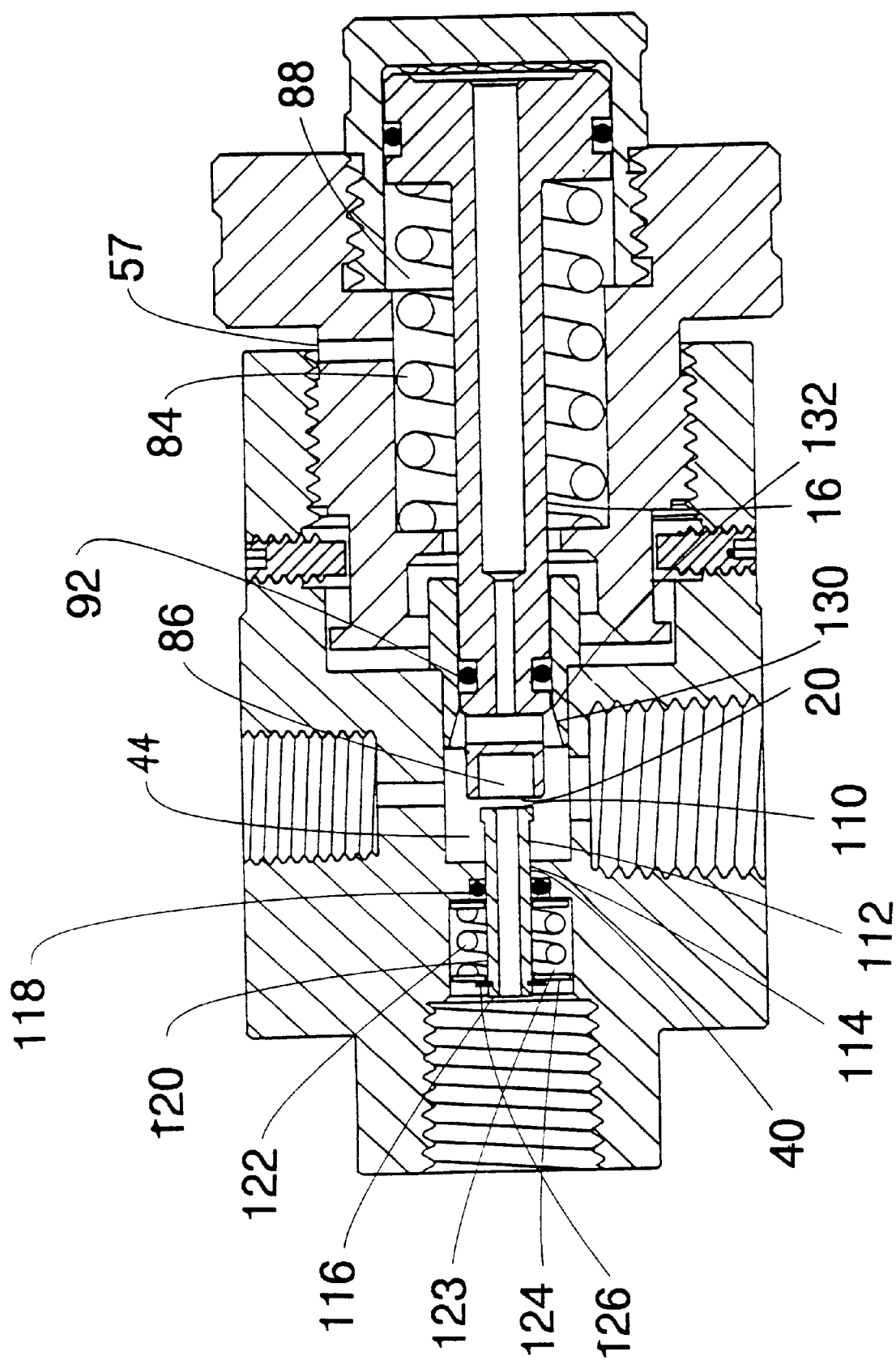
FIG. 6 is a cross-sectional elevational view through the longitudinal axis of an alternate preferred embodiment of applicant's present invention.

FIG. 6 includes another preferred embodiment of applicant's pressure regulator. FIG. 6 provides for a movable high-pressure inlet orifice (110). Movable high-pressure inlet orifice (110) is part of a tube (112) slideably engaged to the walls (114) of the high-pressure inlet port (40). Tube (112), having movable orifice (110) at a first end located within intermediate chamber (44), has a removed second end (116) exposed to the high-pressure fluid, the subject of which is regulated. "O" ring or other sealing means (118) maintains a fluid sealing relation between outside walls (120) of the tube (112), preventing fluid leakage between high-pressure fluid source and intermediate chamber (44). Spring (122) retained in spring chamber (123) by plate (124) which is held to tube (112) near the second end by clip (126) prevents high-pressure fluid from forcing tube (112) through port (40). However, as the high-pressure source drops off, spring (122) will tend to move orifice (110) and tube (112) away from first end (20) of stem (16), requiring additional linear compression on spring (84) to cut off pressure at the preselected cut-off pressure.

Use of the spring-biased, movable seat helps prevent the drop off of outlet pressure cut-off while inlet pressure (source) drops. For example, if a 3000 psi source issued and cut-off pressure initially is set at 150 psi, as the source pressure drops cut-off pressure drops also, so that, for example, when the source bottle is only 1500 psi, cut-off may occur at, say, 130 psi rather than preset 150 psi. Without the movable seat feature, slight readjustment of the valve bodies would be required by moving the seat farther from the stem and resetting the 150 psi cut-off pressure. This is the result, in part, of frictional forces of the piston against the walls on which it slides and the diminishing of high-pressure fluid working in conjunction with spring (84) to unseat the piston stem.

In any case, high pressure will urge tube (112) against spring (122) causing some compression and moving seat (86) towards first end (110). sah When the two valve bodies are adjusted to a cut-off pressure of, say, 500 psi and the fluid pressure is 3000 psi then, when there is a drop off in the intermediate chamber to below 500 psi, spring (84) will move the stem away from seat (86) and allow high-pressure fluid into the inner chamber until the 500 psi is again met. In the fixed inlet embodiment (see FIGS. 4 and 5), when the fluid pressure source drops to, say, 1000 psi, then the outlet drops below the 500 psi cut-off because of less sealing force required to close the valve. However, with the movable inlet design, spring (84) is forced to compress more (by buildup of pressure at outlet) as movable inlet orifice (110) actually moves away from stem (20) under urging of spring (122).

FIG. 6 also includes an automatic bleed down feature. "O" rings (92) provide a seal against the walls of the inner chamber and the piston stem. Further, it can be seen in FIG. 6 that, where walls of the inner chamber meet the end of the piston stem, they are canted outward at walls portions (130). Thus, when the "O" rings meet leading edge (132) of canted walls portion (130), the integrity of the seal is compromised and fluid in the inner chamber can leak past the "O" rings into spring (88) chamber and out relief port (57). This feature serves two purposes. First, it allows a bleed down of first chamber pressure while regulator output pressure is being adjustably lowered. Second, it allows emergency pressure relief in the event of malfunction or structural failure by allowing blowout through relief port (57) from the inner chamber.

For the bleed down feature, the following example is offered. While the user attempts to decrease the outlet pressure from, say, 600 psi to 300 psi, he will be threading the two valve bodies so piston seat is pressed against inlet orifice (110). Adjustment will continue while the user hears a "hiss" of escaping fluids from relief port (57). The outlet fluid pressure will be adjusted to drop below the desired 300 psi setting. "O" ring (92) will then reset with spring (84). The user will then adjust up to the desired 300 psi outlet cut-off pressure.

Figure 7:
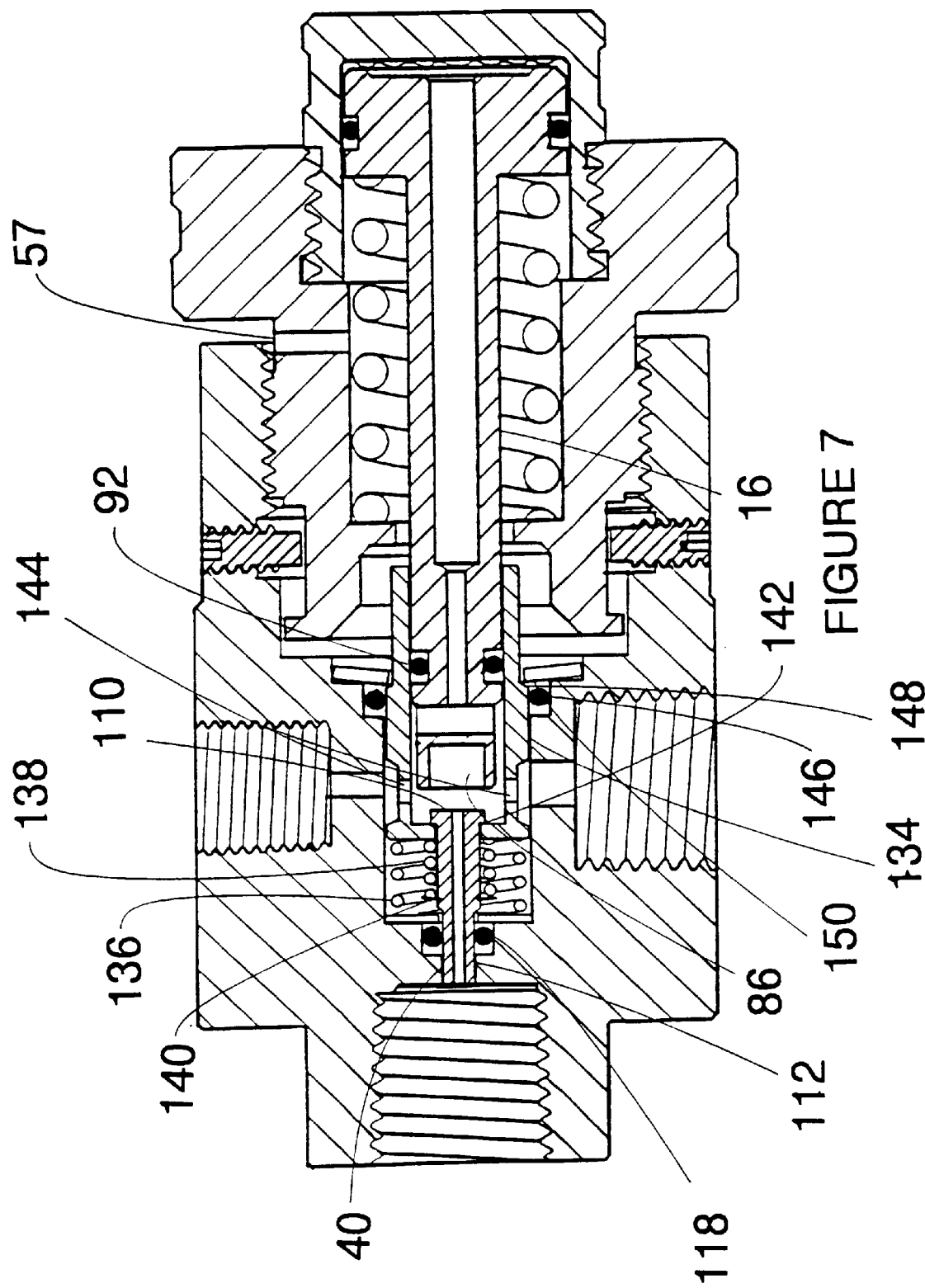
FIG. 7 is a cross-sectional elevational view of an alternate preferred embodiment of applicant's regulator.

FIG. 7 illustrates a means for providing bleed down capabilities as a preferred alternative embodiment to that discussed in FIG. 6. This embodiment includes a sliding stem receiving member (134), typically cylindrical, for enclosure within the walls of the first chamber. Sliding stem receiving member (134) slideably engages along inner walls thereof, the walls of piston stem (16) in fluid sealing relation at "O" rings (92) at a first end of the sliding stem receiving member (134). At a second end of the sliding stem receiving member (134), it engages the first end of movable tube (112). Two springs act on sliding stem receiving member (134). First sliding stem receiving member spring (136) engages the first chamber walls adjacent high pressure port (40) for urging sliding stem receiving member (134) away from high pressure port (40). Second sliding stem receiving member spring (138) engages plate (140) adjacent and attached to movable tube (112) between the first and second ends thereof and also engages the second end of sliding stem receiving member (134) to urge outer walls of the first end of movable tube (112) against the inner walls second end of the sliding stem receiving member (134) at lip (142) of inlet orifice (110). Ports (144) provide fluid communication between the inner and outer walls of the sliding stem receiving member (134). "O" ring (146) provides a fluid sealing relation between shoulder (148) on outer walls of the sliding stem receiving member and lip (150) on walls of first chamber (106), under bias of first sliding stem receiving member spring (136).

Bleed down is accomplished by threading the two valve bodies towards one another. When seat (86) engages movable inlet orifice (110) further threading will break the seal at "O" ring (146) as shoulder (148) moves away from lip (150), allowing fluid from the first chamber to escape the first chamber through the spring chamber and out relief port (57). As before, threading will be adjusted back and forth until the new, lower desired cut-off pressure is reached.

Terms such as "left", "right", "up", "down", "bottom", "top", "front", "back", "in", "out" and the like are applicable to the embodiment shown and described in conjunction with the drawings. These terms are merely for the purposes of description and do not necessarily apply to the position or manner in which the invention may be constructed or used.

Although the invention has been described in connection with the preferred embodiment, it is not intended to limit the invention to a particular form set forth, but on the contrary, it is intended to cover such alternatives, modifications, and equivalents as may be included within the spirit and the scope of the invention as defined by the appended claims.

We claim:

1. A fluid pressure regulator for engaging a high-pressure fluid source comprising:

a regulator housing having a high-pressure inlet fluid port and a low-pressure outlet fluid port and a chamber allowing fluid communication between said inlet fluid port and said outlet fluid port;

a piston having a piston body and a stem, said piston slidable towards and away from said inlet fluid port in response to fluid pressure in said chamber, said piston capable of seating against said inlet fluid port;

a first spring engageable with said piston for urging said piston away from said inlet fluid port;

a first valve body and a second valve body and wherein said first valve body includes walls defining said inlet fluid port and said outlet fluid port and wherein said second valve body includes walls in fluid sealing relation with said piston body, and wherein said first spring engages walls of said second valve body and said piston body to urge said piston away from the inlet fluid port of said first valve body: and a movable tube for engaging the walls of the chamber, said movable tube including a first opening in communication with the high-pressure fluid source and a second opening in communication with said chamber: and a second spring cooperating with said movable tube for moving said moveable tube away from the stem face of said piston stem.

2. The fluid pressure regulator of claim 1 further including a second spring for urging said piston towards said inlet fluid port.

3. The fluid pressure regulator of claim 1, further including adjustment means for dynamic external adjustment allowing the user to select and preset the distance between the first spring and the inlet fluid port, wherein the external adjustment allows the user to set the outlet fluid pressure.

4. The fluid pressure regulator of claim 3, wherein said adjustment means further comprises walls integral with the first valve body and walls integral with the second valve body, the walls capable of being threadably engaged.

5. The fluid pressure regulator of claim 1 further comprising means to releasably lock said first valve body to said second valve body.

6. The fluid pressure regulator of claim 1, wherein said piston includes walls defining a channel through the piston stem and piston body.

7. The fluid pressure regulator of claim 1, wherein said movable tube is axially aligned with said piston stem for engaging the stem face of said piston stem.

8. The fluid pressure regulator of claim 1 further comprising:

means cooperating with said piston for relieving pressure from the chamber of the valve housing in response to movement of the piston.

9. A fluid pressure regulator comprising:

a piston having a piston body, including a piston body, piston face and a stem, said piston slideable towards and away from said inlet fluid port in response to fluid pressure in said chamber, said piston capable of seating against said fluid inlet port;

a regulator housing having a high pressure inlet fluid port and a low pressure outlet fluid port and a chamber allowing fluid communication between said inlet fluid port and said outlet fluid port and walls defining a piston chamber for engaging said piston;

a first spring engageable with said piston for urging said piston away from said inlet fluid port; and means responsive to the pressure of the high pressure fluid source for moving said inlet fluid port away from the stem of the piston as the pressure of the high pressure source decreases.

10. The fluid pressure regulator of claim 9 further including means providing fluid communication between said chamber and said piston chamber such that fluid pressure in said chamber also acts on the piston face of said piston.

11. The fluid pressure regulator of claim 9 further including:

fluid pressure relief vent; and means responsive to relative movement of piston stem towards the inlet fluid port for venting fluid pressure from said chamber through said fluid pressure relief vent.

12. The fluid pressure regulator of claim 9 wherein the regulator housing has a first body part and a second body part, the first body part including the piston chamber and the walls engaging the first spring and the second body part including walls defining the chamber, and further including means to adjust the position of the first body part relative to the second body part.

13. The fluid pressure regulator of claim 9 further including;

means providing fluid communication between said chamber and said piston chamber such that fluid pressure in said chamber also acts on the piston face of said piston; and means responsive to relative movement of piston stem towards the inlet fluid port for venting fluid pressure from said chamber through said fluid pressure relief vent; and wherein the regulator housing has a first body part and a second body part, the first body part including the piston chamber and the walls engaging the first spring and the second body part including walls defining the chamber, and further including means to adjust the position of the first body part relative to the second body part.

* * * * *